United States Patent [19]

Chang

[11] Patent Number: 5,332,552
[45] Date of Patent: Jul. 26, 1994

[54] ENHANCED GAS SEPARATION FOR BUBBLE COLUMN DRAFT TUBES

[75] Inventor: Min Chang, Warren, N.J.

[73] Assignee: Exxon Research and Engineering Company, Florham Park, N.J.

[21] Appl. No.: 992,984

[22] Filed: Dec. 18, 1992

[51] Int. Cl.$^5$ ............................ F27B 15/08; B01J 8/20
[52] U.S. Cl. ........................ 422/140; 422/224; 422/227; 422/231; 422/239
[58] Field of Search ............... 422/140, 224, 227, 228, 422/231, 239, 215

[56] References Cited

U.S. PATENT DOCUMENTS

| | | | |
|---|---|---|---|
| 2,853,369 | 9/1958 | Kolbel | 23/288 |
| 2,868,627 | 1/1959 | Kolbel et al. | 23/288 |
| 3,414,386 | 12/1968 | Mattix | 422/140 X |
| 4,751,057 | 6/1988 | Westerman | 422/197 |
| 5,211,917 | 5/1993 | Hookham | 422/140 X |
| 5,219,532 | 6/1993 | Buttke et al. | 422/140 |

OTHER PUBLICATIONS

"Effects of Fine Bubbles on Flow Patterns in Bubble Column with Suspended Solid Particles" Morooka, et al, J. Chem. Eng. of Japan, vol. 19, No. 6, 1986, pp. 507–512.

"Gas Holdup and Volumetric Liquid-Phase Mass Transfer Coefficient in Solid Suspended Bubble Column with Draught Tube", Koide, et al, J. Chem Eng. of Japan, vol. 18, No. 3, 1985, pp. 248–254.

"Application of Airlift Gas-Liquid-Solid Reactors in Biotechnology", Siegel and Robinson, Chem Eng. Science vol. 47, No. 13/14, pp. 3215–3229, 1992.

"The Catalytic Synthesis of Hydrocarbons from H$_2$/CO Mixtures over the Group VIII Metals", Vannice, J of Catalysis 37, 449–461, (1975).

"Hydrocarbon Synthesis, Hydrogenation and Cyclization" Emmett, Catalysis, vol. IV, pp. 103–108, Reinhold Publishing Corp. 1956.

"Titania-Supported Metals as CO Hydrogenation Catalysts", Vannice, Journal of Catalysis 74, 199–202 (1982).

"Sparged Loop Reactors" Joshi et al, The Canadian Journal of Chemical Engineering, vol. 68, Oct. 1990, 705–741.

"Reaction Technology in Bubble Columns" Deckwer, Fundamentals of Chemical Technology Process Technology of the Chemical and Related Industries, Otto Salle Verlag Publishers, Sauerlander Publishing 1985, Chapter 1.

"Loop Reactors" Blenke, Adv. Biochem eng. vol. 13, 1979, pp. 121–214.

Primary Examiner—Robert J. Warden
Assistant Examiner—Amalia Santiago
Attorney, Agent, or Firm—Joseph J. Allocca

[57] ABSTRACT

Slurry bubble columns equipped with downcomers which have high efficiency gas disengagement means fitted on top of the slurry liquid reaction mixture comprising an inverted channel having a gas vent extending out of the apex of the inverted channel and a liquid by-pass pipe extending from the side of the inverted channel at a point below the apex to under the liquid level and emptying into the downcomer. The inverted channel is fitted to the top of said downcomer and the bottom edge of which inverted channel is in contact with the surface of the slurry mixture in the slurry bubble column reaction zone. Improved catalyst distribution and circulation, mass and heat transfer results from catalyst in gas-lean slurry flowing through the liquid by-pass tubes in the inverted channel and flowing into and down the downcomer to the bottom of the bubble column reactor. Hydrogen or any rejuvenating gas can be introduced into the bottom of the downcomer to restore catalyst activity as the catalyst moves down the downcomer.

3 Claims, 1 Drawing Sheet

ENHANCED GAS SEPARATION FOR BUBBLE COLUMN DRAFT TUBES

FIELD OF THE INVENTION

Improved catalyst circulation and distribution, mass and heat transfer are obtained in slurry bubble columns equipped with vertical draft tube downcomer means when such means have improved, high efficiency gas disengagement means comprising inverted channels, attached to the tops and surrounding of said draft tube downcomer thereby preventing the uncontrolled passage of slurry down said draft tube downcomer, the bottom edge of which inverted channel extend over and touch the surface of the reaction slurry, said inverted channels having a gas vent pipe extending out of the apex of the inverted channel and a liquid by-pass pipe extending from the side of the inverted channel at a point below the apex to under the liquid level of the reaction slurry and emptying into the draft tube downcomer which thereby circulates the catalyst emptying into it through the liquid by-pass pipe to the bottom of the slurry bubble column reactor. The downcomer can be fitted with hydrogen sparger to effect catalyst reactivation—rejuvenation on either a continuous of periodic basis.

BACKGROUND OF THE INVENTION

Slurry reactors are well known for carrying out highly exothermic, three phase, catalytic reactions. Usually called "bubble columns" these reactors have a liquid phase in which solid catalyst particles are dispersed or held in suspension by a gas phase bubbling through the liquid phase, thereby creating a slurry. These reactors provide improved heat transfer characteristics for the exothermic reaction, and the bubbling gas provides essentially all of the energy necessary for maintaining the catalyst dispersed in the liquid phase.

Bubble column reactors typically have a multiplicity of tubes suspended within a shell-type housing, the tubes being filled with a heat transfer medium, e.g., steam, which absorbs the heat generated by the exothermic reaction occurring on the shell side of the tubes in the main body of the housing.

As previously stated, in slurry bubble columns, the catalyst particles are suspended by the gas entering the bubble columns through bottom sited distributors. Often, catalyst particles in these reactors are non-uniformly distributed in the axial direction of the reactor vessel within the range of gas velocities of interest to the practitioner. Under these conditions the reactor operation is limited by "hot spots" which are formed by stagnant zones of catalyst near the bottom of the column where the highest catalyst concentration is found or in stagnant zones. Non-uniform catalyst distribution also contributes to non-uniform catalyst aging and inefficient catalyst utilization insofar as the reaction progresses only when reactants are in contact with catalyst. In hydrocarbon synthesis processes such "hot spots" force the reactor to operate under less than maximum efficiency conditions.

It would be an advance if, in whatever configuration the reaction vessel may take, catalyst within the slurry reaction vessel could be more uniformly distributed and circulated so as to insure more even catalyst aging in the course of the reaction, more effective use of the catalyst by insuring a higher probability that the maximum amount of available catalyst is circulating in the reaction zone to promote the reaction by eliminating stagnant zones of standing catalyst.

In the downcomer, a separate hydrogen or any rejuvenating gas can be used to restore the catalyst activity by removing contaminants from the catalyst and liquid.

SUMMARY OF THE INVENTION

Catalyst distribution and circulation, and mass and heat transfer are improved in slurry bubble column reactors by use of substantially vertical downcomer means comprising vertical tubes open at both ends extending from the top of the slurry level in the slurry reactor to just above the bottom of said reactor. Around the top peripheral outer circumferential rim of which downcomer is attached a gas disentrainment arrangement comprising an inverted channel which rings the downcomer and inhibits direct fluid communication between the top of the downcomer and the top of the slurry level of the reaction slurry in the reactor and optionally having a weir fitted along the apex of the inverted channel, said inverted channel extending over the top of the reactor slurry, the bottom edge of which inverted channel opposite the edge of attachment to the downcomer is in contact with the reaction slurry, and having a gas vent extending out of the inverted channel, preferably out of the apex of the inverted channel so as to permit gaseous communication between the gas space formed by the inverted channel over the slurry and the gas disentrainment space at the top of and common to bubble column reactors. A liquid by-pass pipe extends from a point in the side of the inverted channel below the apex and between the apex and the edge of attachment to the downcomer to under the slurry level of the reaction slurry and empties into the interior of the downcomer thereby circulating the catalyst emptying into the downcomer to the bottom of the slurry bubble column reactor. The downcomer can be fitted with hydrogen introduction means such as a sparger or other devices to effect catalyst reactivation—rejuvenation in the downcomer on either a continuous or periodic basis.

The downcomer may take any of a number of forms. For instance, multiple individual vertical downcomers may be situated within the reaction zone of the slurry bubble column reactor, each such downcomer being fitted with its own peaked cap gas disentrainment arrangement. The use of individual or multiple vertical downcomers for catalyst circulation is disclosed and claimed in copending application, Attorney Docket No. OP-3721, U.S. Ser. No. 994218 filed even date herewith in the names of Behrmann, Mauldin and Pedrick.

Alternatively the slurry bubble column can itself comprise a double walled vessel wherein the inner wall vessel and outer wall vessel are substantially coaxial, thereby forming an annulus between their respective walls. The outer vessel serves as the main containment vessel having gas inlet and gas outlet means and product recovery means and a floor above the gas inlet means which floor is fitted with gas distribution means such as bubble caps multi-cone distributors for introduction of reaction gases into the reaction zone. The reactor slurry liquid comprising catalyst, liquid reaction product, and reaction gas extends from the floor of the vessel to a height within the vessel below the common gas disengagement space at the top of the vessel which is space in common to slurry bubble column reactors. The inner wall vessel serves as the main reaction zone within the main containment vessel and is of a height which extends from the top of the reaction slurry level to just above the floor of the main containment vessel. The annulus formed between the inner and outer vessel walls serves as a downcomer extending around the entire internal periphery of the reaction vessel.

The inverted channel which is attached to the peripheral circumferential rim of the downcomer may be of any convenient form. The inverted channel may take the form of an inverted V. Alternatively it may be a simple inverted U or semi-circular in contour.

This inverted channel is attached along one of its edges to a peripheral circumferential top rim of the inner wall vessel so as not to itself cover or extend over the open top of the annulus but to extend over the top of the reaction liquid in the reactor, the other edge of which inverted channel opposite the edge of attachment to the inner wall vessel is in contact with the top surface of the reactor liquid, thereby creating a gas space within its inverted contour.

The placement of the inverted channel is such that it inhibits direct, uncontrolled fluid communication between the open top of the downcomer and the top surface of the slurry reaction liquid. To insure this flow inhibition the apex of the inverted channel may be topped with a weir.

A gas vent is fitted into this inverted channel, preferably at its apex, so as to permit gaseous communication between the main common gas disentrainment space of the reactor vessel and the gas space at the interior of the peaked cap inverted channel. At one side of the inverted channel, at a point below the apex, and between the apex and the edge of attachment of the inverted channel to the interior wall vessel, a liquid by-pass pipe is fitted into the inverted channel, it placement being such that liquid flowing through such pipe is directed to and empties into the interior space of the annulus. Liquid exit means are present at the bottom of the annulus in the form of the space between the bottom edge of the interior wall vessel and the floor of the main containment vessel, permitting the liquid entering the annulus at the top to exit the annulus at the bottom and thus recirculate the liquid to the bottom of the reaction.

A gas introduction means can be fitted into the bottom of the annulus to permit the introduction of regenerating gas into the downwardly moving slurry in the annulus.

In either embodiment, it is preferred that the edge of the inverted channel which contacts the surface of the reaction slurry be higher than the edge of the inverted channel which is attached to the top rim of the respective downcomer means. Therefore, if the inverted channel is in the form of an inverted V, the leg of the V in contact with the surface of the reaction slurry is shorter than the leg attached to the rim of the downcomer.

Figure 1:
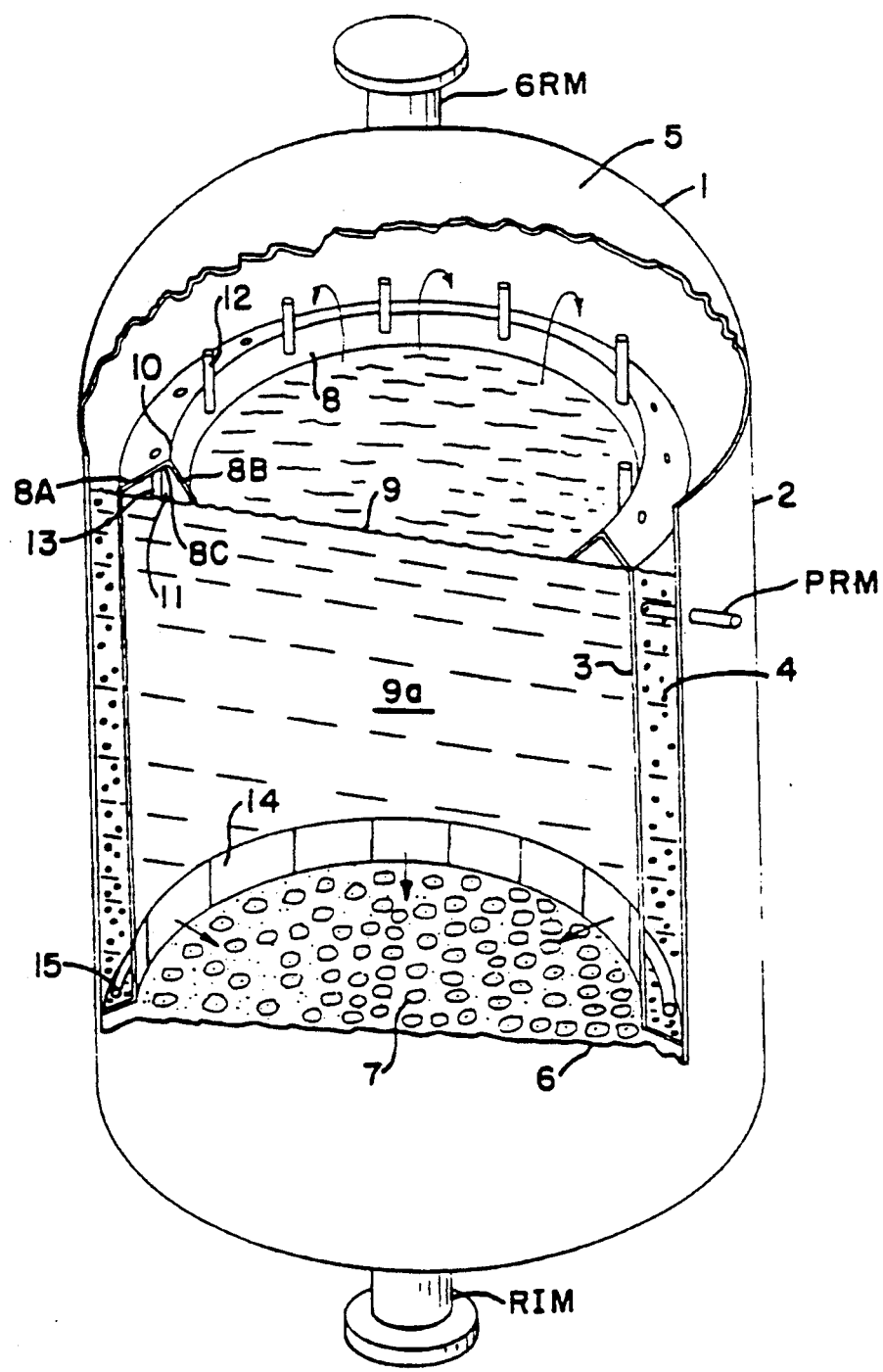
FIG. 1 presents a schematic of a preferred embodiment. The hydrocarbon synthesis vessel (1) comprises a doubled wall vessel having exterior vessel wall (2) and interior vessel wall (3) defining an annular space (4) between them. The interior vessel wall (3) terminates at its upper end below the main gas disentrainment space (5) of the synthesis vessel (1), the bottom end of said interior vessel wall (3) terminates just above the floor (6) of the synthesis vessel (1). The floor (6) is fitted with synthesis gas introduction means (7). The top of interior vessel wall (3) is topped by an inverted channel (8). One edge (8A) of inverted channel (8) is attached to the top edge of interior vessel wall (3) while the other edge (8B) of inverted channel (8) extends out over the main reaction zone (9) of the synthesis vessel (1) Synthesis gas is introduced into vessel (1) through reactant inlet means (RIM) while synthesis product is recovered from vessel (1) through product recovery means (PRM) and unreacted synthesis gas and other gaseous materials are removed from the top of vessel (1) through gas recovery means (GRM). and, when the vessel is in use for hydrocarbon synthesis, that edge (8B) is in contact with the top surface of the hydrocarbon synthesis slurry (9) in the reaction (9a) zone, said slurry comprising catalyst, synthesis product and synthesis gas. Inverted channel (8) is topped at its apex (8C) by weir (10) which prevents the uncontrolled entry of synthesis slurry into annulus space (4). A gas disentrainment space (11) is formed in the interior of the inverted channel (8), with a gas vent pipe (12) extending out of the top of said inverted channel (8). A liquid vent pipe (13) pierces inverted channel (8) on the side between inverted channel apex (8C) and edge (8A) and to provide fluid communication between the main reaction zone (9a) and the annulus (4) whereby slurry which has been disengaged from gas in the inverted channel gas disentrainment space (11) is introduced into the annulus and because of its higher density than the gas-containing synthesis slurry passes down the annulus (4) to the bottom of vessel (1) for reintroduction through vent spaces (14) into the reaction vessel. The bottom of annulus (4) can be fitted with separate gas introduction means (15) whereby hydrogen gas can be introduced into the downwardly moving slurry in the annulus to continuously reactivate the catalyst. The hydrogen introduced into the annulus is introduced at a low enough velocity so as not to interfere with the downward flow of the slurry in the annulus.

What is claimed is:

1. A slurry bubble column reactor comprising a double walled vessel defined by an inner vessel wall having a peripheral circumferential top rim and a bottom edge, and an outer main containment vessel wall surrounding said inner vessel wall, said outer main containment vessel having a top and a bottom, and wherein the inner vessel wall and the outer vessel wall are substantially co-axial and have a space between them forming an annulus between said respective walls, the outer main containment vessel wall having a synthesis gas inlet means at the bottom, gas outlet means and product recovery means at the top, and a floor above the gas inlet means which floor is fitted with gas distribution means, the inner vessel wall serving as a main reactor zone, the peripheral circumferential top rim of the inner vessel wall having attached to it an inverted channel having an apex and two edges, the point of attachment of the inverted channel to the inner wall being along a first one of said two edges of said inverted channel, a second of said two edges of said inverted channel extending over the main reaction zone thereby creating a gas space within its inverted contour and which inverted channel has a gas vent extending out of, and upwardly from, said inverted channel, and having a liquid by-pas pipe extending from a point on one side of the inverted channel below the apex of said inverted channel and between said apex and the edge of attachment to the inner vessel wall, to under said top rim of said inner vessel wall and which by-pass pipe empties into the annulus, and liquid exit means at the bottom of the annulus defined by openings in the bottom edge of the interior vessel wall and above the gas distributor means of the main containment vessel.

2. The apparatus of claim 1 wherein the apex of the inverted channel is fitted with a weir.

3. The apparatus of claim 1 wherein the bottom of said annulus contains hydrogen gas introduction means.

* * * * *